Patented Mar. 31, 1953

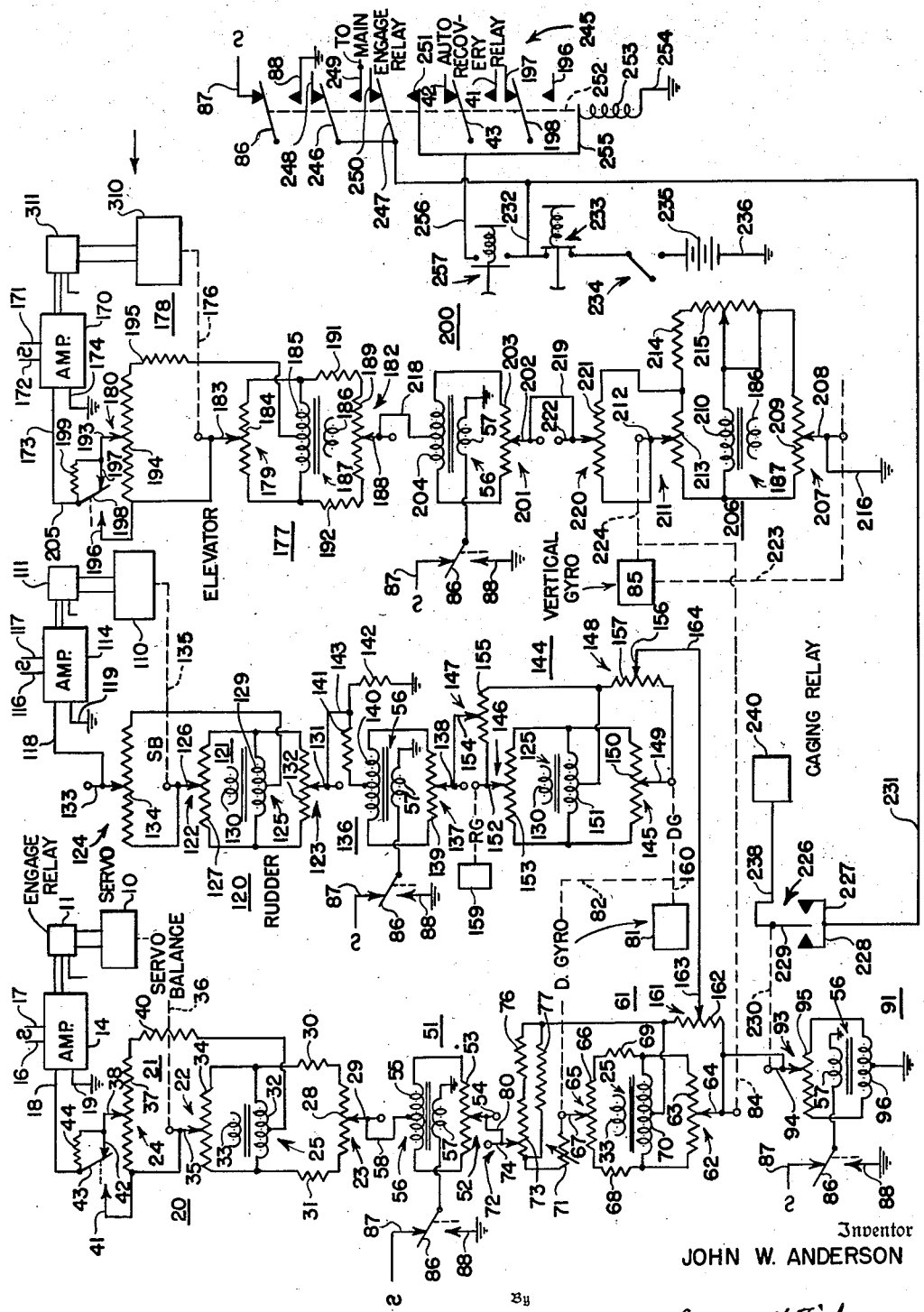

2,633,314

UNITED STATES PATENT OFFICE 2,633,314

AUTOMATIC PILOT

John W. Anderson, Edina, Minn., assignor to Minneapolis-Honeywell Regulator Company, Minneapolis, Minn., a corporation of Delaware Application August 22, 1949, Serial No. 111,735

8 Claims. (Cl. 244—77)

This invention pertains to automatic steering mechanisms for dirigible craft such as automatic pilots for aircraft or the like. This invention more particularly is an improvement in the type of steering mechanism disclosed in the U. S. patent application of William J. McGoldrick, S. N. 31,493, filed June 7, 1948.

In the aforesaid application of McGoldrick, there is provided an automatic pilot which includes gyroscope devices for automatically stabilizing an aircraft about its yaw, roll, and pitch axes. Manual adjustable means are provided to change the course or attitude of said aircraft through the automatic pilot. Further means are provided therein during an emergency operation for rendering the manual means ineffective in its adjusted position and to render the aircraft subservient to the gyroscope devices.

The air craft is automatically brought to a predetermined attitude by operation of the control surfaces of the aircraft as determined by the gyroscope devices.

It is an object of this invention to modify the normal operation of the control surfaces of the aircraft as determined by the gyroscope devices during such emergency operation.

It is a further object of this invention where such control surfaces are motor operated, and such motor is controlled by a balanceable voltage circuit, which circuit is unbalanced by a said gyroscope device producing a voltage signal and is rebalanced by a said motor operated voltage producing device, to provide means for increasing suddenly the normal output of said motor operated voltage producing device thereby requiring less operation of said motor to rebalance said circuit.

It is a further object of this invention to obtain signals from said gyroscope proportional to the relative tilt thereof with respect to its support and to modify such signals by absorbing a portion of the signals so that the movements of the motor in a closed loop system are not proportional linearly to said signals but such movements define a locus which is of a higher order than a linear relation.

It is a further object of this invention to provide novel means in a closed loop control system to vary the ratio of controller movement to follow up movement between the value of greater than one to less than one.

The above and other objects of the invention will appear on consideration of the following description on conjunction with the attached drawing disclosing one embodiment of the invention.

Referring to the drawing, the sole figure is a schematic representation of a portion of an existing automatic pilot with which the present invention is concerned.

In order that the following description of the invention may be more clearly understood consideration thereof should be taken with respect to the accompanying drawing wherein there is shown a three channel control system associated with the aileron, rudder, and elevator, for automatically controlling an aircraft about three respectively perpendicular axes. These three axes are termed the roll, the pitch, and the turn or yaw axes. Control about the roll axis is provided by an aircraft aileron (not shown), which is operated from an aileron servomotor 10. The aileron servomotor 10 is of the type which may be reversibly controlled from an amplifier in accordance with the phase relationship of a signal and supply voltage applied to the amplifier and may be of the type referred to in the aforesaid application of William J. McGoldrick or as disclosed in the patent to M. C. Hamby, 2,466,702. The servomotor is controlled through an aileron engage relay 11 from an aileron amplifier 14.

The aileron amplifier preferred is of the phase discriminator type and alternatively operates one or another of a pair of relays (which control the supply of current to the servomotor) in accordance with the phase relationship between an alternating input control signal voltage and the alternating voltage supply for the amplifier. The amplifier 14 like the servomotor may be of the type disclosed in the aforesaid patent to Hamby, 2,466,702 or in the patent to Willis H. Gille et al., 2,425,734 and is provided with power supply connections 16, 17 and signal input connections 18, 19.

The signal input circuit to the aileron amplifier 14 is of the closed loop type and thus includes a balanceable network 20. The network 20 includes a variable impedance servo balance-auto recovery network 21; a variable impedance aileron trim control network 51; a directional gyro bank-vertical gyro roll variable impedance network 61; and a manually operable turn control network 91.

The variable impedance network 21 includes a rebalancing potentiometer 22, an automatic recovery potentiometer 23, a ratio potentiometer 24, and a transformer 25. Potentiometer 22 includes an adjustable slider 35 and a resistor 34 whose opposite ends are connected across a secondary winding 32 of transformer 25. Transformer 25 includes a primary winding 33 which may be connected to the ship's supply or other source of alternating current. Potentiometer 23 includes an adjustable slider 29 and a resistor 28. Resistor 28 has one end connected through a resistor 31 to one end of secondary winding 32 and has its opposite end connected through a resistor 30 to the remaining end of secondary winding 32. The ratio potentiometer 24 includes an adjustable tap 38 and a resistor 37. One end of resistor 37 is connected to the slider 35 of the rebalancing potentiometer 22. The opposite end of resistor 37 is connected through a protective resistor 40 to a center tap of secondary winding 32. The slider 35 of the rebalance potentiometer is positioned from the servomotor 10 through a suitable operating mechanism 36.

Associated with the slider 35 of the rebalance potentiometer 22 and the adjustable tap 38 of ratio potentiometer 24 is a single-pole double-throw switch comprising two relay contacts 41 and 42 and an operable arm 43 coacting with said contacts. The relay contacts and arm constitute part of an automatic recovery relay to be described. The slider 35 is connected to the designated "in" relay contact 41. The slider or tap 38 is connected to the "out" relay contact 42. The contact arm 43 normally engages the out contact 42. The contact arm 43 is connected to one input connection 18 of amplifier 14. A protective resistor 44 is connected across tap 38 and the contact arm 43 in order to insure the transmission of the output voltage of the network 20 to amplifier 14 in event that the contact arm 43 does not properly engage the out contact 42.

The trim control variable impedance network 51 includes a trim potentiometer 52 having a slider 54 and a resistor 53. The resistor 53 is connected across the ends of a secondary winding 55 of a transformer 56 having a primary winding 57. The primary winding 57 has one end connected to ground. The opposite end of the winding is connected to a contact arm 86. In one position this contact arm engages an out contact 87 which may be connected to the ship's supply of alternating voltage. In another position the contact arm 86 engages an in contact 88 which is connected to ground. The two contacts 87, 88 and the contact arm 86 constitute part of the afore-mentioned automatic recovery relay. A lead 58 extends from a center tap of secondary winding 55 to slider 29 of the auto recovery potentiometer 23. The slider 54 of the trim potentiometer 52 may be manually adjusted or may be automatically adjusted from a centering motor (not shown) as disclosed in the aforesaid application of William J. McGoldrick.

The variable impedance network 61 includes a vertical gyro roll potentiometer 62, a directional gyro banking potentiometer 65, a transformer 25, a variable resistor 71, a voltage divider potentiometer 72, a fixed resistance 76, and a fixed resistance 77. The potentiometer 62 consists of a slider 64 and a resistor 63 which is connected across the ends of a secondary winding 70 of transformer 25. Since it is convenient to provide a single transformer having a single primary but a plurality of secondary windings, the transformers of networks 21 and 61 represent merely two different sections of the same transformer and differ merely in respect of their secondary windings. Potentiometer 65 includes an adjustable slider 67 and a resistor 66. One end of resistor 66 is connected through a fixed resistor 68 to one end of secondary winding 70, the opposite end of resistor 66 is connected through a resistor 69 to the opposite end of secondary winding 70. Slider 67 is connected in series with the variable resistor 71 to one end of the voltage dividing resistor 73. The opposite end of resistor 73 is connected in series with fixed resistor 76 to a center tap of secondary winding 70. The fixed resistor 77 is shunted across the voltage dividing resistor 73 and the fixed resistor 76. The voltage dividing resistor 72 includes a manually adjustable tap 74. A lead 80 extends from the tap 74 to the slider 54 of the trim potentiometer 52.

The slider 67 of potentiometer 65 is operated from a directional gyroscope 81 through a suitable operating connection 82. The directional gyroscope 81 is a sensitive instrument and is of the type having a rotor mounted for rotation about a horizontal axis and is so positioned in the aircraft that changes in position of the aircraft about its yaw axis causes relative movement between the gyro operated slider 67 and the resistor 66 carried by the aircraft. The directional gyroscope may be of the type disclosed in the aforesaid application of William J. McGoldrick.

The slider 64 of the potentiometer 62 is controlled by means of a suitable operating connection 84 from a vertical flight gyroscope 85. The gyroscope is of the type well known in the art whose rotor rotates about an axis which is maintained perpendicular with respect to the surface of the earth. This gyroscope is so mounted in the aircraft that upon movement of the craft about its roll or longitudinal axis there will be a relative displacement between the gyro stabilized slider 64 and the resistor 63 which is carried by the aircraft.

The impedance network 91 includes a turn control potentiometer 93 having a manually adjustable slider 94 and a resistor 95. The resistor 95 is connected across the ends of a secondary winding 96 of transformer 56 which has a primary winding 57. The transformer shown in the network 91 merely represents a different section, from that shown in network 51, of a transformer having the same primary winding but a plurality of secondary windings. For ease of understanding, one end of the primary winding 57 is again shown in network 91 as connected to ground and has its opposite end connected to a contact arm 86 which may alternatively engage one space contact 87 connected to the source of alternating voltage or may engage a contact 88 connected to ground whereby the primary winding 57 may alternatively be energized or be connected to ground. The secondary winding 96 has a grounded center tap to thereby connect the remaining end of network 20 to amplifier ground lead 19.

The aircraft is controlled about the yaw or vertical axis by a rudder (not shown) of the aircraft which is driven by a rudder servomotor 110. Control of the rudder servomotor 110 is provided by a rudder amplifier 114, which is similar to aileron amplifier 14, through an input relay 111. The rudder amplifier has power input connections 116, 117 which are connected to the ship's supply of alternating voltage. Amplifier 114 includes signal input connections 118 and 119. The signal input connections 118, 119 are connected to a balanceable control network 120. The network 120 includes a rebalancing-auto recovery variable impedance network 121; a rudder trim control network 136; a yaw rate-yaw deviation variable impedance network 144; a turn coordination voltage divider 161; and variable impedance network 91 of the aileron bridge circuit.

The impedance network 121 includes a rebalancing potentiometer 122, an automatic recovery potentiometer 123, a rudder ratio potentiometer 124, and a transformer 125. Potentiometer 122 includes a rudder servomotor operated slider 126 and a resistor 127. The slider 126 is driven from the rudder servomotor through an operative connection 135. The resistor 127 is connected across the ends of a secondary winding 129 of transformer 125. The transformer includes a primary winding 130 connected to the ship's supply. The potentiometer 123 includes a manually positioned slider 131 and a resistor 132. The resistor 132 is connected across the ends of secondary winding 129 in parallel with the resistor 127. The rudder ratio potentiometer 124 includes a manually adjustable tap 133 and a resistor 134. The resistor has one end connected to the slider 126 and the other end connected to a center tap of secondary winding 129. The tap 133 is connected to the input connection 118 of amplifier 114.

The variable impedance network 136 includes a centering potentiometer 137 comprising a slider 138 and a resistor 139 and a transformer 56 having a primary winding 57 and a secondary winding 140. The resistor 139 is connected across the ends of secondary winding 140. The slider 138 may be manually adjustable or also may be motor operated as disclosed in the aforesaid application of William J. McGoldrick. One end of primary winding 57 of transformer 56 is connected to ground and the other end is connected to the contact arm 86 which coacts with spaced contacts 87 or 88. Associated with network 136 are two fixed resistors 141 and 142. The resistors are connected in series. The free end of resistor 141 is connected to a center tap of secondary winding 140. The junction of resistors 141 and 142 is connected to the slider 131 of the auto recovery potentiometer 123. The free end of resistor 142 is connected to ground whereby the resistors 141 and 142 form a potential divider across networks 136, 144, 161 and 91 to reduce the ratio of controller movement (such as sliders 94, 64, or 149) with respect to controlled movement (slider 126).

Impedance network 144 includes a directional gyro potentiometer 145, a rate gyro potentiometer 146, a rate coordination potentiometer or voltage divider 147, a bomb coordination potentiometer 148, and a transformer 125. The rate gyro potentiometer 146 includes an adjustable slider 152 and a resistor 153. The slider 152 is operated by a rate gyroscope 159.

The rate gyroscope 159 is of the type well known in the art in which the rotor is mounted for rotation about a horizontal axis and which may precess under restraint about a horizontal axis at right angles to the axis of the rotor. The rotor has but two degrees of freedom and is so mounted in the aircraft that upon movement of the craft about the yaw axis the rotor will precess about the second horizontal axis under spring restraint. Such gyros are well known in the art and are variously referred to as turn indicators.

The resistor 153 is connected across the ends of the secondary winding 151 of transformer 125. The transformer includes a primary winding 130 connected to the ship's supply. The directional gyro rudder potentiometer 145 includes a slider 149 and a resistor 150. The slider 149 is adjusted or stabilized by the directional gyro 81 through a suitable operating connection 160. The resistor 150 is connected across the ends of secondary winding 151. The rate coordination potentiometer 147 includes an adjustable tap 154 and a resistor 155. One end of resistor 155 is connected to the slider 152 and the other end is connected to a center tap of secondary winding 151. The adjustable tap 154 is connected by a lead to the slider 138. The bomb coordination potentiometer 148 includes a resistor 157 and an adjustable tap 156. The resistor 157 has one end connected to the center tap of secondary winding 151 and its opposite end connected to the slider 149. A lead 164 extends from the tap 156 to the tap 163 of the turn control coordination potentiometer 161. The turn control coordination potentiometer 161 includes a resistor 162 and an adjustable tap 163. The resistor 162 has one end connected to the center tap of secondary winding 70 of network 61 and has its other end connected to the slider 64 of the vertical gyro roll potentiometer 62. The remainder of the input circuit of the rudder amplifier 114 includes the network 91 having a secondary winding 96 connected to ground. This ground of secondary winding 96 is common with the ground of the connection 119 of amplifier 114. Thus a complete circuit for the amplifier control elements of amplifier 114 has been described.

Control about the pitch axis of the aircraft is provided by an elevator (not shown). The elevator is operated by an elevator servomotor 310 which is controlled through an elevator engage relay 311 from an elevator amplifier 170.

The elevator amplifier 170 is similar to aileron amplifier 14 and includes power input terminals 171, 172 which may be connected to the ship's supply. The control elements of amplifier 170 are connected to signal input connections 173, 174 which are connected in a circuit which includes a balanceable network 177. Network 177 includes a servo balance-auto recovery variable impedance network 178; a centering or elevator trim adjusting variable impedance network 200; and an up elevator-pitch control variable impedance network 206.

The impedance network 178 includes a servo balance potentiometer 179, an automatic recovery potentiometer 182, a servo balance ratio potentiometer 180, and a transformer 187. The potentiometer 179 includes a slider 183 positioned by the elevator servomotor 310 through a suitable operating connection 176 and a resistor 184 whose opposite ends are connected across a secondary winding 185 of transformer 187. The transformer 187 includes a primary winding 186 which may be connected to the ship's supply of alternating current. The automatic recovery potentiometer includes a manually adjustable slider 188 and a resistor 189. One end of the resistor 189 is connected through a resistor 191 to one end of secondary winding 185 and the other end of resistor 189 is connected through a resistor 192 to the opposite end of secondary winding 185. The ratio potentiometer 180 includes an adjustable tap 193 and a resistor 194. One end of resistor 194 is connected to the slider 183 of the balance potentiometer and the other end of resistor 194 is connected in series with a protective resistor 195 to a center tap of secondary winding 185. The tap 193 may be manually adjusted. Coacting with the sliders 183 and the tap 193 is a pair of relay contacts 196, 197 and a relay arm 198. The contacts and contact arm form a portion of the afore-mentioned automatic recovery relay. Contact 196 is the "in" contact and is connected to slider 183. Contact 197 is the "out" contact which is normally engaged by the contact arm 198. Contact 197 is connected to adjustable tap 193. Contact arm 198 is connected through a lead wire 205 to the input connection 173 of amplifier 170. A protective resistor 199 is connected across the contact arm 198 and the contact 197 to assure a connection to the amplifier should the contact arm 198 not properly engage the contact 197.

The impedance network 200 includes an elevator centering potentiometer 201 and a transformer 56. Potentiometer 201 includes an adjustable slider 202 and a resistor 203. The opposite ends of resistor 203 are connected to the ends of secondary winding 204 of transformer 56. The slider 202 like aileron trim slider 54 may be manually adjusted or automatically adjusted. The primary winding 57 of transformer 56 has one end connected to ground and its other end connected to a contact arm 86 of the automatic recovery relay. Arm 86 coacts with spaced contacts 87 or 88. A lead wire 218 extends from a center tap of secondary winding 204 of transformer 56 to slider 188 of potentiometer 182.

The variable impedance network 206 includes the vertical gyro pitch potentiometer 207, a vertical gyro up elevator potentiometer 211, an up elevator coordination potentiometer 220, a fixed resistor 214, a variable resistance 215, and a transformer 183. Potentiometer 207 includes a slider 208 and a resistor 209. The slider 208 is positioned or stabilized from the vertical flight gyro 85 through a suitable operating connection 223. The operation is such that upon movement of the aircraft about its pitch axis the slider 208 is stabilized with respect to the resistor 209 which is mounted on the aircraft. The resistor 209 is connected across a secondary winding 210 of transformer 187. Transformer 187 includes a primary winding 186 connected to the ship's supply. The potentiometer 211 includes a slider 212 and a resistor 213. The slider 212 is operated from the vertical flight gyro 85 through a suitable operating connection 224. The arrangement is such that upon movement of the craft about the roll axis the slider 212 is stabilized with respect to the resistor 213 carried by the aircraft. The arrangement for operating the slider 212 from the gyro 85 is such that irrespective of the direction of tilt of the aircraft about the roll axis the slider 212 will be moved in the arrangement shown toward the left end of the resistor 213. On end of resistor 213 is connected to an end of secondary winding 210 and the opposite end of resistor 213 is connected through the fixed resistor 214 and the variable resistor 215 in series, with the opposite end of secondary winding 210. The up elevator coordination potentiometer includes a manually adjustable tap 222 and a resistor 221. The resistor 221 has one end connected to the slider 212 and the opposite end connected to the junction of resistors 213 and 214. A lead 216 extends from the slider 208 of potentiometer 207 to ground which is common with the ground of connection 174, to complete the circuit for the control elements of amplifier 170.

As stated, the three control circuits described control the operation of the aileron, rudder, and elevator servomotors during automatic pilot control of the aircraft. In this automatic pilot control, the directional gyroscope 81 and the vertical gyroscope 85 coact with the signal control circuits or networks to maintain an aircraft on a desired heading and in straight and level flight.

Changes in heading are effected through the turn control potentiometer 93 of network 91. During changes in heading, it is necessary to prevent the directional gyro from operating its potentiometers to wipe out any control signals introduced by the turn control. To this end, suitable caging mechanism may be provided for the gyroscope or other means may be provided for preventing the operation of the directional gyro potentiometers. Means for operating the caging mechanism will now be described.

Associated with the turn control potentiometer 93 is a turn control caging relay switch 226. This switch 226 includes two spaced contacts 227, 228 and an arm 229 engageable with either contact. The arm 229 is positioned with the turn control slider 94 through a suitable operating connection 230. The two contacts 227, 228 are connected together and a lead wire 231 extends from their junction and it is connected through lead 232, a normally closed momentarily open main disconnect switch 233, a single pole single throw main switch 234, to a direct current supply indicated as the battery 235. The opposite end of battery 235 is connected through a lead wire 236 to ground. The contact arm 229 is connected through a lead wire 238 to a caging relay 240 which corresponds with the caging relay 415 in the aforesaid McGoldrick application. Upon movement of the switch arm 229 of the turn control caging relay switch 226, it is evident that a circuit is completed through the caging relay. The operation of the caging relay effects caging of the directional gyro all as disclosed in the aforementioned application of William J. McGoldrick.

The present arrangement like that in the aforesaid application of William J. McGoldrick includes an automatic recovery relay 245. The relay herein differs from that in the prior application in that it includes five sets of contacts instead of three. In the present arrangement the three (upper-most) pairs of contacts and their coacting contact arms perform the same function as provided by the three sets of contacts and their respective contact arms of the relay 370 in the aforesaid application.

Specifically, the auto recovery relay 245 includes five contact arms 86, 246, 247, 43, and 198. These arms coact respectively with the contacts 87, 88; 248 and 249; 250 and 251; 41 and 42; 197 and 196. The contact arms are biased by any suitable means (not shown) in the position illustrated in the figure. The contact arms are actuated through an armature 252 by an operating coil 253. The arms occupy normally the "out" position shown and when the coil 253 is energized the arms move in the opposite position or "in" position. The contact 87 as stated is connected to the ship's supply of alternating voltage and its opposing contact is connected to ground. Contact 248 is an idle contact and its opposed contact 249 is connected as shown in the aforesaid McGoldrick application to the winding of an automatic pilot master or main engage relay. The upper contact 250 is an idle contact and its opposing contact 251 serves as the recovery relay holding contact for the coil 253. The remaining pairs of contacts (41, 42), (197, 196), as well as their contact arms 43 and 198, have been described in connection with the networks 20 and 177. The coil 253 of the relay 245 is connected through leads 255 and 256 through the normally open-momentarily closed auto recovery switch 257 with the energized lead 232.

Operation

The operation of the system will now be considered. The system is assumed to be installed in an aircraft which additionally provides for manual operation of the control surfaces. With the aircraft at the desired altitude, the pilot operates the control surfaces directly to manually trim the aircraft for straight and level flight.

The operation of the balanceable impedance networks connected to the respective input terminals of amplifiers 14, 114, and 170 is conventional. For example in network 20, with sliders 35, 29, 54, 67, 64, and 94 in their mid-position or electrical centers of their respective resistors, the network 20 is balanced. The ampifier 14 is in a quiescent state. If slider 94 be moved, its potential with respect to that of the center tap of winding 96 changes and a voltage is derived that unbalances the network 20. A control signal due to the unbalance in network 20 is applied to amplifier 14. The amplifier operates the servomotor 10 in accordance with the phase of the control signal. Motor 10 positions slider 35 which changes its potential with respect to the center tap of winding 32 until a voltage equal but opposite in phase to that from slider 94 is obtained when network 20 is again balanced. It is believed that the operation of any network and the various controllers of sliders therein will be apparent from the above brief description.

The auto recovery switch 257 may be operated with the craft trimmed to place the rudder, aileron, and elevator under the control of their respective servomotors. The respective sliders 29, 131, and 188 of the aileron channel auto recovery potentiometer 23, the rudder channel auto recovery potentiometer 123 and the elevator channel auto recovery potentiometer 182 may be adjusted so that the plane is in the desired flight attitude for automatic recovery.

The main disconnect switch 233 may now be operated to disassociate the automatic pilot from the control surfaces. Thereafter the automatic pilot may be reconnected with its control surfaces by energizing the aileron, rudder, and elevator engage relays through the main engage relay which may now be directly connected to battery 235 rather than through relay 245 by a separate manual switch in the normal manner such as shown in the McGoldrick application.

With the automatic pilot reengaged, the slider 74 of the bomb coordination potentiometer 72 may be adjusted so that the amount of displacement of the ailerons may be coordinated with the rudder displacement upon operation of the respective sliders 67 of the potentiometer 65 and the slider 149 of the potentiometer 145 by the directional gyro 81. The arrangement of the resistor 77 of network 61 with respect to the bomb coordination potentiometer 72 is to provide for a non-linear change in the bank angle (despite movements of slider 67 linearly proportional to deviation) for increases in the rate of turn due to the operation of the rudder. Thus the non-linear increase in the bank angle with increase in rate of turn of the aircraft provides for coordination of the displacement of the ailerons with respect to the rudder so that the turn may be properly executed.

In the prior application of William J. McGoldrick, upon operation of an automatic recovery switch, and the resultant operation of an automatic recovery relay, the turn control potentiometer and the trim potentiometers, the latter corresponding with potentiometers 52, 137, and 201, are rendered ineffective. If the craft attitude had been changed by operation of a trim potentiometer, the trim signal is suddenly removed from the network resulting in a voltage signal on the amplifiers due to the displacement between the gyro operated slider and the motor driven rebalance slider. With the automatic recovery relay 245 energized the turn control and the trim control potentiometers herein are also made ineffective and the rudder, aileron, and elevator control circuits are controlled by the gyro operated potentiometers, the automatic recovery potentiometers and the rebalancing potentiometers.

During this automatic recovery operation in the McGoldrick arrangement, the selected voltages from the ratio potentiometers, which are connected across the rebalance potentiometers' signal generators, were taken from the ratio potentiometer taps and applied to the amplifiers concerned. For example, in the elevator channel, herein the input connection 173 was connected directly to the slider or tap 193 of the elevator rebalance ratio potentiometer 180.

With such an arrangement for reducing the rebalance signal applied to the amplifier, it was found that initiating automatic recovery from unusual attitudes of the craft and consequently the operation of the respective control surfaces due to difference in position of the gyro and motor driven sliders caused violent changes in attitude of the aircraft of such an extent that the structure of the aircraft was dangerously affected.

While for ordinary function of flight, the impedance networks could be rebalanced from the ratio potentiometer taps whereby high autopilot gain was achieved it would be disastrous during automatic recovery operation. It was determined that reduction of the autopilot gain momentarily during this automatic recovery operation would avoid the danger. The gain reduction was arranged herein by permitting the full voltage generated in the rebalancing potentiometers such as potentiometers 22, and 180 in the aileron, and elevator networks to be applied unmodified to their respective amplifiers of the system and reduce the amount of control surface displacement.

This reduction in the value of control surface displacement while in automatic recovery causes less violent changes in attitude of the aircraft and thus permitted safe operation without overstressing the aircraft structure.

It is now apparent that there has been provided an improved automatic pilot for an aircraft wherein the displacement of the ailerons with respect to the rudder, for various rates of turn of the aircraft, may be made a non-linear relation by a parallel path connected across a signal generator whose operation is proportional to change in heading of the aircraft.

It is also evident that an arrangement has been provided across a plurality of control devices in a closed loop control circuit to cause the ratio of controller movement with respect to controlled or follow up movement to be made less than one.

It is further evident that there has been provided an arrangement for automatically reducing the normal displacement of the control surfaces of an aircraft in response to control signals while in an emergency condition whereby reduced force is applied on the control surfaces and less stress incurred by the aircraft frame.

While one embodiment of the invention has been disclosed, it is to be understood that the invention is not confined to the particular form described but is determined by the appended claims.

I claim:

1. Control apparatus for an aircraft having a normal attitude about an axis thereof and having operative motor means adapted to position a control surface for controlling the craft about said axis, said apparatus comprising: control means for said motor means; means for operating said control means comprising a balanceable, electrical signal combining network, said network including attitude stabilizing means responsive to change in the normal position of the craft about said axis for deriving a first voltage signal for unbalancing said network to effect operation of said surface to restore said craft to normal position, follow-up means driven by said motor means for deriving a second voltage signal to cause displacement of said surface proportional to change in craft normal position, relay controlled ratio means for selectively supplying the entire second signal to said network or normally selecting a portion of said second signal, and manually operative means for deriving a third signal for permanently changing the position of said surface relative to said stabilizing means for altering the said normal attitude of said craft about said axis, wherein said network provides means for combining said first, the selected portion of said second, and said third signals; and manually controlled means for rendering said third signal deriving means ineffective, to thus restore said craft to said normal position with respect to said stabilizing means and for operating said relay means, whereby the entire second signal is effective to oppose said deviation signal to require less operation of said motor means and thus provide reduced control surface displacement to rebalance said network.

2. Control apparatus for an aircraft having a control surface that may be manually or motor operated, said apparatus comprising: a balanceable network having stabilizing means responsive to change in normal attitude of the craft about an axis for applying an unbalancing effect to said network, means for applying a rebalancing effect to said network during said change in attitude during manual operation of said surface, and motor driven means for effecting the balance of said network during motor operation of said surface including means for applying less than said driven means effect in full; means for operating said motor means and connected to said balanceable network, and selective means for automatically applying the full effect of said motor driven means to said network and for rendering said rebalancing means ineffective, whereby the network balance point is determined by said stabilizing means solely and the entire effect of said motor driven means may be opposed to said attitude responsive means unbalancing effect to provide less proportionate control surface movement for the same extent of unbalance of said network.

3. Control apparatus for a dirigible craft having motor means for controlling said craft about an axis, said apparatus comprising: amplifying means for controlling direction of movement of said motor means; a first signal means including a potentiometer means responsive to deviations of said craft about said axis, a first voltage divider potentiometer having its resistor connected across the output of said potentiometer means; a resistor shunting said voltage divider resistor; a second signal means having a potentiometer means driven by said motor means; a second voltage divider potentiometer having a resistor connected across the output of said motor driven potentiometer means; a single pole double throw switch having an arm and two contacts; a connection from said arm to said amplifying means; a connection from one contact normally abutted by said arm to an adjustable slider of said second voltage divider; a connection from said other contact to one end of said second voltage divider resistor; a connection from a slider of said first divider resistor to the other end of said second voltage divider; a connection from one end of the first voltage divider potentiometer resistor to said amplifying means; and means for operating said switch arm to engage said other contact.

4. Control apparatus for an aircraft having a plurality of motor means for operating the ailerons, rudder, and elevator of said craft, said apparatus comprising: an individual control means for each motor means; a balanceable network for said aileron motor control means including a first signal means responsive to tilt of said craft about the roll axis thereof, a second manually operable signal means, and a third signal means driven by said aileron motor means, and means connecting said signal means in series; relay means connected between said third signal means and said aileron control means and normally applying less than said full third signal to said control means; a balanceable network for said rudder motor control means including said first signal means; said second signal means, a fourth signal means driven by said rudder motor means, and means connecting said signal means in series; a balanceable network for said elevator motor control means including a fifth signal means responsive to tilt about the roll axis, a sixth signal means responsive to tilt about the pitch axis, a seventh signal means driven by said elevator motor means, and means connecting said fifth, sixth, seventh signal means in series; relay means connected between said seventh signal means and said elevator control means and normally applying less than said full seventh signal to said control means; and means responsive to operation of said relay means for suddenly increasing the portion of said third and seventh signals applied to their respective control means and for rendering said second signal means ineffective.

5. Control apparatus for an aircraft having motor means for operating a control surface, said apparatus comprising: an amplifier for controlling said motor means; means for connecting or disconnecting said amplifier from said motor means; a balanceable electrical circuit for operating said amplifier; an adjustable controller in said circuit for supplying a voltage to unbalance said circuit to cause operation of said motor means and responsive to tilt of said craft about an axis thereof; a controlled device in said circuit and driven by said motor means to supply a voltage to rebalance said circuit to limit movement of said motor means during connection of said amplifier and motor means, a controller in said circuit to rebalance said circuit during craft tilt while said amplifier and motor means are disconnected, and relay means in said circuit for abruptly changing the voltage from said controlled device applied to said circuit and for rendering said last controller ineffective during connection of said amplifier and motor means, for altering the ratio of movement of said controlled device with respect to said adjustable tilt responsive controller.

6. Control apparatus for an aircraft having operative motor means for controlling the craft about an axis, said apparatus comprising stabilizing means responsive to deviation of the craft about said axis from a normal position for controlling said motor means, follow up means adapted to be driven by said motor means for opposing said stabilizing means to cause the movement of the motor means normally to have a predetermined ratio to the deviation of the craft, manually adjustable means for altering the position of the craft about said axis to be maintained by said stabilizing means, manually operable emergency means effective to render quickly said manually adjustable means ineffective and thereby revert to said normal position as the position to be maintained, and means also simultaneously controlled by said manually operable means for decreasing the ratio of motor movement to deviation of the craft so as to avoid too rapid movement of the craft to said normal position.

7. Control apparatus for an aircraft having operative motor means for positioning a control surface for controlling the craft about an axis, said apparatus comprising stabilizing means responsive to deviation of the craft about said axis from a normal position for controlling said motor means, follow up means adapted to be driven by said motor means for opposing the control of said stabilizing means to cause the displacement of the motor means normally to have a predetermined ratio to the deviation of the craft without appreciable time lag of displacements, manually adjustable means for altering the effect of position to be maintained by said stabilizing means to change the position of the craft about said axis, manually operable emergency means effective to render quickly said manually adjustable means ineffective and restore the normal position to be maintained but thereby providing a time lag between the deviation and said motor displacement, and means concomitantly controlled by said manually operable means for decreasing the ratio of motor displacement to deviation of the craft so as to avoid too rapid movement of the control surface and overstress of said craft.

8. Control apparatus for a dirigible craft comprising: a motor means for controlling said craft about an axis; an amplifier for controlling direction of movement of said motor means; a network having a first signal voltage providing means including a potentiometer means providing a voltage linearly varying with deviation of said craft about an axis, a first voltage divider connected across the output of said potentiometer means; and an impedance shunting said voltage divider; a second signal voltage means having a potentiometer means driven by said motor means; a second motor means for controlling the craft about a second axis; a second amplifier for controlling direction of movement of said second motor means; a third signal voltage means including a potentiometer providing a voltage varying linearly with the deviations of said craft; a fourth signal voltage means driven by said second motor means; and means for connecting said network and second signal voltage means in series to said amplifier and for connecting said third and fourth voltage means in series with said second amplifier, whereby the displacement of said craft about said first axis varies non-linearly for linear voltage signals in said first and third signal voltage means.

JOHN W. ANDERSON.

REFERENCES CITED

The following references are of record in the file of this patent:

UNITED STATES PATENTS

| Number | Name | Date |
|---|---|---|
| 2,416,097 | Hansen et al. | Feb. 18, 1947 |
| 2,423,534 | Upton | July 8, 1947 |
| 2,429,642 | Newton | Oct. 28, 1947 |
| 2,432,862 | Coulbourn | Dec. 16, 1947 |
| 2,452,311 | Markusen | Oct. 26, 1948 |